United States Patent
Aihara

(10) Patent No.: US 11,098,136 B2
(45) Date of Patent: Aug. 24, 2021

(54) MODIFIED POLYMER LATEX PRODUCTION METHOD

(71) Applicant: ZEON CORPORATION, Tokyo (JP)

(72) Inventor: Shunjin Aihara, Tokyo (JP)

(73) Assignee: ZEON CORPORATION, Tokyo (JP)

( * ) Notice: Subject to any disclaimer, the term of this patent is extended or adjusted under 35 U.S.C. 154(b) by 175 days.

(21) Appl. No.: 16/485,343

(22) PCT Filed: Jan. 31, 2018

(86) PCT No.: PCT/JP2018/003121
§ 371 (c)(1),
(2) Date: Aug. 12, 2019

(87) PCT Pub. No.: WO2018/155110
PCT Pub. Date: Aug. 30, 2018

(65) Prior Publication Data
US 2019/0359736 A1    Nov. 28, 2019

(30) Foreign Application Priority Data
Feb. 24, 2017 (JP) .............................. JP2017-033331

(51) Int. Cl.
*C08C 19/36* (2006.01)
*C08L 51/04* (2006.01)

(52) U.S. Cl.
CPC .............. *C08C 19/36* (2013.01); *C08L 51/04* (2013.01); *C08L 2312/00* (2013.01)

(58) Field of Classification Search
CPC ........ C08C 19/36; C08L 51/04; C08F 236/08; C08F 136/08; C08F 36/08; C08G 8/18
See application file for complete search history.

(56) References Cited

U.S. PATENT DOCUMENTS

| 4,256,871 A * | 3/1981 | Papalos ............... B01F 17/0057 524/457 |
| 5,539,015 A * | 7/1996 | Horii ..................... C09D 5/027 523/102 |
| 2008/0051498 A1* | 2/2008 | Kodama .................. C08K 5/14 524/394 |
| 2015/0376322 A1* | 12/2015 | Nakamura ............... C08K 5/41 524/571 |

FOREIGN PATENT DOCUMENTS

WO    2014/129547 A1    8/2014

OTHER PUBLICATIONS

Apr. 10, 2018 Search Report issued in International Patent Application No. PCT/JP2018/003121.

* cited by examiner

*Primary Examiner* — Robert C Boyle
(74) *Attorney, Agent, or Firm* — Oliff PLC

(57) ABSTRACT

A method for producing a modified polymer latex includes: adding a carboxyl group-containing compound, an anionic surfactant having a weight-average molecular weight of less than 500, and an anionic surfactant having a weight-average molecular weight of 500 or more to a polyisoprene latex; and reacting the polyisoprene with the carboxyl group-containing compound in a presence of the anionic surfactant having a weight-average molecular weight of less than 500 and the anionic surfactant having a weight-average molecular weight of 500 or more.

9 Claims, No Drawings

MODIFIED POLYMER LATEX PRODUCTION METHOD

TECHNICAL FIELD

The present invention relates to a method for producing a modified polymer latex capable of effectively suppressing the occurrence of aggregates even with a high solid content concentration.

BACKGROUND ART

Conventionally, it is known that dip-molded products used in contact with human bodies, such as nipples, balloons, gloves, balloons, and stalls, are obtained by dip-molding a latex composition containing natural rubber latex. However, natural rubber latex contains proteins that cause symptoms of allergy in human bodies and therefore may be problematic as a dip-molded product that directly contacts the mucosa or organs of living bodies. Therefore, removal of proteins in natural rubber latex by purification or the like and use of a synthetic rubber latex instead of natural rubber have been investigated.

For example, Patent Document 1 discloses a carboxy-modified synthetic polyisoprene latex obtained by graft polymerization of synthetic polyisoprene with a monomer having a carboxyl group in the water phase. However, in the technique of Patent Document 1, there has been a problem of the occurrence of aggregates when the concentration of synthetic polyisoprene is high in the water phase during the graft polymerization of synthetic polyisoprene with a monomer having a carboxyl group in the water phase.

RELATED ART

Patent

Patent Document 1: International Publication No. WO 2014/129547

SUMMARY OF THE INVENTION

Problem to be Solved by the Invention

The present invention has been devised in view of such an actual situation, and an object thereof is to provide a method for producing a modified polymer latex capable of effectively suppressing the occurrence of aggregates even with a high solid content concentration.

Means for Solving the Problem

As a result of dedicated research to achieve the aforementioned object, the inventors have found that the aforementioned object can be achieved by adding a carboxyl group-containing compound to a latex of synthetic polyisoprene or polyisoprene such as natural rubber from which proteins are removed and using a surfactant having a weight average molecular weight of less than a predetermined value and a surfactant having a weight average molecular weight of a predetermined value or more in the reaction of polyisoprene in the latex with the carboxyl group-containing compound, thereby accomplishing the present invention.

That is, the present invention provides a method for producing a modified polymer latex, the method comprising: adding a carboxyl group-containing compound, an anionic surfactant having a weight-average molecular weight of less than 500, and an anionic surfactant having a weight-average molecular weight of 500 or more to a polyisoprene latex; and reacting the polyisoprene with the carboxyl group-containing compound in a presence of the anionic surfactant having a weight-average molecular weight of less than 500 and the anionic surfactant having a weight-average molecular weight of 500 or more.

In the present invention, the anionic surfactant having a weight-average molecular weight of 500 or more is preferably a compound having a sulfonic acid group.

In the present invention, the anionic surfactant having a weight-average molecular weight of 500 or more is preferably a compound having a naphthalene structure.

Further, the present invention provides a method for producing a latex composition, the method comprising a step of adding a cross-linking agent to a modified polymer latex obtained by the aforementioned production method.

Further, the present invention provides a method for producing a dip-molded product, the method comprising a step of dip-molding a latex composition obtained by the aforementioned production method.

Further, the present invention provides a method for producing an adhesive layer-forming substrate, the method comprising a step of forming an adhesive layer using a modified polymer latex obtained by the aforementioned production method on a surface of a substrate.

Effects of Invention

The present invention can provide a method for producing a modified polymer latex capable of effectively suppressing the occurrence of aggregates even with a high solid content concentration, and a method for producing a dip-molded product using a modified polymer latex obtained by the aforementioned production method.

DESCRIPTION OF EMBODIMENTS

In the method for producing a modified polymer latex of the present invention, a carboxyl group-containing compound, an anionic surfactant having a weight-average molecular weight of less than 500, and an anionic surfactant having a weight-average molecular weight of 500 or more are added to a polyisoprene latex, and the polyisoprene is reacted with the carboxyl group-containing compound in the presence of the anionic surfactant having a weight-average molecular weight of less than 500 and the anionic surfactant having a weight-average molecular weight of 500 or more.

In the production method of the present invention, a synthetic polyisoprene latex or natural rubber latex from which proteins have been removed can be used as the polyisoprene latex.

Synthetic Polyisoprene Latex

First, the synthetic polyisoprene latex used in the production method of the present invention will be described.

Synthetic polyisoprene contained in the synthetic polyisoprene latex may be an isoprene homopolymer or may be a copolymer with another ethylenically unsaturated monomer that is copolymerizable with isoprene. The content of isoprene units in the synthetic polyisoprene is preferably 70 wt % or more, more preferably 90 wt % or more, further preferably 95 wt % or more, particularly preferably 100 wt % (homopolymer of isoprene) with respect to all monomer units, for ease of obtaining a dip-molded product that is flex and has excellent tensile strength.

Examples of the other ethylenically unsaturated monomers that are copolymerizable with isoprene include conjugated diene monomers other than isoprene such as butadiene, chloroprene, and 1,3-pentadiene; ethylenically unsaturated nitrile monomers such as acrylonitrile, methacrylonitrile, fumaronitrile, and α-chloroacrylonitrile; vinyl aromatic monomers such as styrene and alkyl styrene; and ethylenically unsaturated carboxylic acid ester monomers such as methyl (meth)acrylate (which means "methyl acrylate and/or methyl methacrylate", and the same hereinafter applies to ethyl (meth)acrylate and the like), ethyl (meth)acrylate, butyl (meth)acrylate, and (meth)acrylic acid-2-ethylhexyl. One of these other ethylenically unsaturated monomers that are copolymerizable with isoprene may be used alone, or a plurality of them may be used in combination.

The synthetic polyisoprene can be obtained by a conventionally known method, for example, by solution polymerization of isoprene with other ethylenically unsaturated copolymerizable monomers used as required, in an inert polymerization solvent, using a Ziegler polymerization catalyst composed of trialkylaluminum-titanium tetrachloride or an alkyl lithium polymerization catalyst such as n-butyl lithium and sec-butyl lithium. The polymer solution of the synthetic polyisoprene obtained by the solution polymerization may be used, as it is, for producing the synthetic polyisoprene latex, but can be used for producing the synthetic polyisoprene latex by extracting solid synthetic polyisoprene from the polymer solution and thereafter dissolving it in an organic solvent.

At this time, impurities such as the residue of the polymerization catalyst remaining in the polymer solution after the synthesis may be removed. Further, an anti-aging agent, which will be described below, may be added into the solution during the polymerization or after the polymerization. Further, a commercially available solid synthetic polyisoprene also can be used.

There are four types of the isoprene units in the synthetic polyisoprene, depending on the bonding state of isoprene, which are cis bond units, trans bond units, 1,2-vinyl bond units, and 3,4-vinyl bond units. For improving the tensile strength of a dip-molded product to be obtained, the content proportion of the cis bond units in the isoprene units contained in the synthetic polyisoprene is preferably 70 wt % or more, more preferably 90 wt % or more, further preferably 95 wt % or more, with respect to all isoprene units.

The weight-average molecular weight of the synthetic polyisoprene is preferably 10,000 to 5,000,000, more preferably 500,000 to 5,000,000, further preferably 800,000 to 3,000,000, in terms of standard polystyrene by gel permeation chromatography. Adjusting the weight-average molecular weight of the synthetic polyisoprene to the aforementioned ranges tends to improve the tensile strength of the dip-molded product and facilitate the production of the synthetic polyisoprene latex.

Further, the polymer/Mooney viscosity ($ML_{1+4}$ at 100° C.) of the synthetic polyisoprene is preferably 50 to 80, more preferably 60 to 80, further preferably 70 to 80.

Examples of the method for obtaining the synthetic polyisoprene latex include (1) a method for producing the synthetic polyisoprene latex by emulsifying a solution or a microsuspension of the synthetic polyisoprene dissolved or finely dispersed in an organic solvent, in water, in the presence of an anionic surfactant and removing the organic solvent, as required, and (2) a method for directly producing the synthetic polyisoprene latex by emulsion polymerization or suspension polymerization of isoprene alone or a mixture of isoprene with an ethylenically unsaturated monomer that is copolymerizable with isoprene, in the presence of an anionic surfactant. The aforementioned production method (1) is preferable since the synthetic polyisoprene with cis bond units at a high proportion in the isoprene units can be used, and a dip-molded product having excellent mechanical properties such as tensile strength is easily obtained.

Examples of the organic solvent used in the aforementioned production method (1) include aromatic hydrocarbon solvents such as benzene, toluene, and xylene; alicyclic hydrocarbon solvents such as cyclopentane, cyclopentene, cyclohexane, and cyclohexene; aliphatic hydrocarbon solvents such as pentane, hexane, and heptane; and halogenated hydrocarbon solvents such as methylene chloride, chloroform, and ethylene dichloride. Among these, alicyclic hydrocarbon solvents are preferable, and cyclohexane is particularly preferable.

The amount of the organic solvent to be used is preferably 2,000 parts by weight or less, more preferably 20 to 1,500 parts by weight, further preferably 500 to 1,500, with respect to 100 parts by weight of the synthetic polyisoprene.

Examples of the anionic surfactants to be used in the aforementioned production method (1) include fatty acid salts such as sodium laurate, potassium myristate, sodium palmitate, potassium oleate, sodium linolenate, and sodium rosinate; alkylbenzenesulfonates such as sodium dodecylbenzenesulfonate, potassium dodecylbenzenesulfonate, sodium decylbenzenesulfonate, potassium decylbenzenesulfonate, sodium cetylbenzenesulfonate, and potassium cetylbenzenesulfonate; alkyl sulfosuccinates such as sodium di(2-ethylhexyl) sulfosuccinate, potassium di(2-ethylhexyl) sulfosuccinate, and sodium dioctyl sulfosuccinate; alkyl sulfate ester salts such as sodium lauryl sulfate and potassium lauryl sulfate; polyoxyethylene alkyl ether sulfate ester salts such as sodium polyoxyethylene lauryl ether sulfate and potassium polyoxyethylene lauryl ether sulfate; and monoalkyl phosphates such as sodium lauryl phosphate and potassium lauryl phosphate.

Among these anionic surfactants, fatty acid salts, alkylbenzenesulfonates, alkyl sulfosuccinates, alkyl sulfate ester salts, and polyoxyethylene alkyl ether sulfate ester salts are preferable, and fatty acid salts and alkylbenzenesulfonates are particularly preferable.

Further, use of at least one selected from the group consisting of alkylbenzenesulfonates, alkyl sulfosuccinates, alkyl sulfate ester salts, and polyoxyethylene alkyl ether sulfate ester salts in combination with fatty acid salts is preferable, and use of alkylbenzenesulfonates in combination with fatty acid salts is particularly preferable, because a slight amount of the residual polymerization catalyst (particularly, aluminum and titanium) derived from the synthetic polyisoprene can be more efficiently removed and generation of aggregates is suppressed in the production of the latex composition. Here, as fatty acid salts, sodium rosinate and potassium rosinate are preferable, and as alkylbenzenesulfonates, sodium dodecylbenzenesulfonate and potassium dodecylbenzenesulfonate are preferable. Further, one of these surfactants may be used alone, or two or more of them may be used in combination.

As described above, use of at least one selected from the group consisting of alkylbenzenesulfonates, alkyl sulfosuccinates, alkyl sulfate ester salts, and polyoxyethylene alkyl ether sulfate ester salts in combination with fatty acid salts allows the obtained latex to contain the at least one selected from alkylbenzenesulfonates, alkyl sulfosuccinates, alkyl sulfate ester salts, and polyoxyethylene alkyl ether sulfate ester salts, and fatty acid salts.

Further, in the aforementioned production method (1), surfactants other than the anionic surfactants may be used in combination, and examples of the surfactants other than the anionic surfactants include copolymerizable surfactants such as sulfoesters of α,β-unsaturated carboxylic acids, sulfate esters of α,β-unsaturated carboxylic acids, sulfoalkyl aryl ethers.

Further, nonionic surfactants such as polyoxyethylene alkyl ethers, polyoxyethylene alkyl phenol ethers, polyoxyethylene alkyl esters, and polyoxyethylene sorbitan alkyl esters may be used in combination, as long as coagulation by the coagulant that is used in dip molding is not inhibited.

The amount of anionic surfactants to be used in the aforementioned production method (1) is preferably 0.1 to 50 parts by weight, more preferably 0.5 to 30 parts by weight, with respect to 100 parts by weight of the synthetic polyisoprene. In the case of using two or more surfactants, the total amount of the surfactants to be used preferably falls within the aforementioned range. That is, for example, in the case of using at least one selected from alkylbenzenesulfonates, alkyl sulfosuccinates, alkyl sulfate ester salts, and polyoxyethylene alkyl ether sulfate ester salts in combination with fatty acid salts, the total amount of these surfactants to be used preferably falls within the aforementioned range. An excessively small amount of the anionic surfactants used may possibly cause a large amount of aggregates in emulsification, or conversely, an excessively large amount thereof facilitates foaming and may possibly cause pinholes in a dip-molded product to be obtained.

Further, in the case of using at least one selected from alkylbenzenesulfonates, alkyl sulfosuccinates, alkyl sulfate ester salts, and polyoxyethylene alkyl ether sulfate ester salts in combination with fatty acid salts as anionic surfactants, the ratio of these surfactants to be used is preferably adjusted to a range of 1:1 to 10:1, more preferably to a range of 1:1 to 7:1, as a weight ratio of "fatty acid salts":"total of at least one surfactant selected from alkylbenzenesulfonates, alkyl sulfosuccinates, alkyl sulfate ester salts, and polyoxyethylene alkyl ether sulfate ester salts". An excessively large ratio of the at least one surfactant selected from alkylbenzenesulfonates, alkyl sulfosuccinates, alkyl sulfate ester salts, and polyoxyethylene alkyl ether sulfate ester salts to be used may possibly cause intense foaming when handling the synthetic polyisoprene, thereby making operations such as long-term standing and addition of a defoamer necessary, which may possibly lead to a decrease in workability and an increase in cost.

The amount of water to be used in the aforementioned production method (1) is preferably 10 to 1,000 parts by weight, more preferably 30 to 500 parts by weight, most preferably 50 to 100, with respect to 100 parts by weight of the organic solvent solution of the synthetic polyisoprene. Examples of the type of water to be used include hard water, soft water, deionized water, distilled water, zeolite water and the like, and soft water, deionized water, and distilled water are preferable.

As a method for adding monomers, a method of adding monomers to be used into a reaction container in a lump, a method of adding monomers continuously or intermittently as polymerization proceeds, a method of partially adding monomers to allow reaction to proceed to a specific conversion rate and then adding the residual monomers continuously or intermittently for polymerization, and the like can be mentioned, for example. Any one of the methods may be employed. In the case of mixing monomers and thereafter adding the monomers continuously or intermittently, the composition of the mixture may be constant or varied.

Further, as the monomers, various monomers to be used may be mixed in advance and then added into the reaction container or may be separately added into the reaction container.

As the device that emulsifies the solution or the microsuspension of the synthetic polyisoprene dissolved or finely dispersed in the organic solvent, in water, in the presence of anionic surfactants, devices that are commercially available in general as emulsifying machines or dispersers can be used without specific limitation. The method for adding the anionic surfactants to the solution or the microsuspension of the synthetic polyisoprene is not specifically limited, and the anionic surfactants may be added in advance to either water, or the solution or the microsuspension of the synthetic polyisoprene, or both of them, or may be added in a lump or dividedly to the emulsified liquid during the emulsification operation.

Examples of the emulsifying device include batch emulsifying machines such as the product name "Homogenizer" (manufactured by IKA Works), the product name "POLYTRON" (manufactured by Kinematica AG), and the product name "TK AUTO-HOMO MIXER" (manufactured by Tokushu Kika Kogyo Co., Ltd.); continuous emulsifying machines such as the product name "TK PIPELINE-HOMO MIXER" (manufactured by Tokushu Kika Kogyo Co., Ltd.), the product name "Colloid mill" (manufactured by Shinko Pantec Co., Ltd.), the product name "SLASHER" (manufactured by NIPPON COKE & ENGINEERING CO., LTD.), the product name "Trigonal wet grinder" (manufactured by Mitsui Miike Chemical Engineering Machinery, Co., Ltd.), the product name "CAVITRON" (manufactured by Eurotec, Ltd.), the product name "MILDER" (manufactured by Pacific Machinery & Engineering Co., Ltd.), and the product name "FINE FLOW MILL" (manufactured by Pacific Machinery & Engineering Co., Ltd.); high-pressure emulsifying machines such as the product name "Microfluidizer" (manufactured by MIZUHO INDUSTRIAL CO., LTD.), the product name "NANOMIZER" (manufactured by NANOMIZER Inc.), and the product name "APV GAULIN" (manufactured by Manton-Gaulin Company); membrane emulsifying machines such as the product name "Membrane emulsifying machine" (manufactured by REICA Co., Ltd.); vibratory emulsifying machines such as the product name "VIBROMIXER" (manufactured by REICA Co., Ltd.); and ultrasonic emulsifying machines such as the product name "Ultrasonic homogenizer" (manufactured by Branson Ultrasonics Corporation). The conditions for the emulsification operation by such emulsifying devices are not specifically limited, and the processing temperature, the processing time, and the like, may be appropriately determined so that a desired dispersion state is achieved.

In the aforementioned production method (1), the organic solvent is desirably removed from the emulsion obtained by the emulsification operation.

As the method for removing the organic solvent from the emulsion, methods that can reduce the content of the organic solvent (preferably, an alicyclic hydrocarbon solvent) in the synthetic polyisoprene latex to be obtained to 500 weight ppm or less are preferable, and methods such as vacuum distillation, normal pressure distillation, water vapor distillation, and centrifugation can be employed, for example.

Further, concentration operation may be applied after the organic solvent is removed, as needed, in order to increase the solid content concentration of the synthetic polyisoprene latex, by methods such as vacuum distillation, normal pressure distillation, centrifugation, and membrane concentration. Centrifugation is particularly preferably performed, since the solid content concentration of the synthetic polyisoprene latex can be increased, and the amount of surfactants remaining in the synthetic polyisoprene latex can be reduced.

The centrifugation is preferably performed, for example, using a continuous centrifuge, under the conditions in which the centrifugal force is preferably 100 to 10,000 G, the solid content concentration of the synthetic polyisoprene latex before centrifugation is preferably 2 to 15 wt %, the feed flow rate into the centrifuge is preferably 500 to 1700 Kg/hr, and the back pressure (gauge pressure) of the centrifuge is preferably 0.03 to 1.6 MPa. The synthetic polyisoprene latex can be obtained as a light liquid after the centrifugation. Further, the amount of surfactants remaining in the synthetic polyisoprene latex can be thereby reduced.

The solid content concentration of the synthetic polyisoprene latex is preferably 30 to 70 wt %, more preferably 40 to 70 wt %. When the solid content concentration is excessively low, the solid content concentration of the latex composition, which will be described below, decreases, and therefore the film thickness of the dip-molded product, which will be described below, decreases, so that the dip-molded product easily breaks. Conversely, when the solid content concentration is excessively high, the viscosity of the synthetic polyisoprene latex increases, so that transfer through a pipe or stirring within a preparation tank may be made difficult in some cases.

The volume-average particle size of the synthetic polyisoprene latex is preferably 0.1 to 10 μm, more preferably 0.5 to 3 μm, further preferably 0.5 to 2.0 μm. Adjusting the volume-average particle size to the aforementioned ranges can make the latex viscosity appropriate to facilitate handling and can suppress formation of a film on the surface of the latex during storage of the synthetic polyisoprene latex.

Further, the synthetic polyisoprene latex may contain additives that are generally contained in the field of latex, such as pH adjusters, defoamers, preservatives, cross-linking agents, chelating agents, oxygen scavengers, dispersants, and anti-aging agents.

Examples of the pH adjusters include alkali metal hydroxides such as sodium hydroxide and potassium hydroxide; alkali metal carbonates such as sodium carbonate and potassium carbonate; alkali metal hydrogen carbonates such as sodium hydrogen carbonate; ammonia; and organic amine compounds such as trimethylamine and triethanolamine, and alkali metal hydroxides and ammonia are preferable.

In the production method of the present invention, natural rubber latex with proteins removed also can be used as the polyisoprene latex, other than the aforementioned synthetic polyisoprene latex. As the natural rubber latex with proteins removed, natural rubber latex known as so-called "deproteinized natural rubber latex", which is obtained by a known method for removing proteins such as a method of decomposing proteins in natural rubber latex, for example, using a protein-degrading enzyme, a surfactant, or the like, and removing them by washing, centrifugation or the like can be used.

Further, as the natural rubber latex with proteins removed, natural rubber latex having a solid content concentration adjusted to fall within the same range of the solid content concentration of the aforementioned synthetic polyisoprene latex is preferably used, and natural rubber latex prepared by adding the same additives may be used.

Method for Producing Modified Polymer Latex

The method for producing a modified polymer latex of the present invention comprises a step of: adding a carboxyl group-containing compound, an anionic surfactant having a weight-average molecular weight of less than 500 (which may be hereinafter referred to as "low-molecular weight surfactant"), and an anionic surfactant having a weight-average molecular weight of 500 or more (which may be hereinafter referred to as "high-molecular weight surfactant") to the aforementioned polyisoprene latex; and reacting polyisoprene contained in the latex with the carboxyl group-containing compound in the presence of the low-molecular weight surfactant and the high-molecular weight surfactant.

The present invention can suppress the occurrence of aggregates (coagula) even if the solid content concentration of the polyisoprene latex is increased by reacting polyisoprene contained in the polyisoprene latex with the carboxyl group-containing compound in the presence of the low-molecular weight surfactant and the high-molecular weight surfactant, thereby enabling a modified polymer latex having a high solid content concentration and suppressing the occurrence of aggregates to be produced. Therefore, the present invention can achieve a high solid content concentration, thereby improving the reaction efficiency in the reaction of polyisoprene with the carboxyl group-containing compound, and increasing the amount of the modified polymer latex to be produced (production efficiency) per unit time, and can reduce the amount of waste solution generated due to concentration in the operation to further increase the solid content concentration by concentrating the modified polymer latex obtained, thereby reducing the environmental load.

The weight-average molecular weight of the low-molecular weight surfactant used in the present invention may be less than 500, preferably 50 to 450, more preferably 200 to 400, further preferably 280 to 360.

The low-molecular weight surfactant is not specifically limited, as long as the weight-average molecular weight is less than 500, but examples thereof include fatty acid salts such as sodium laurate, potassium myristate, sodium palmitate, potassium oleate, sodium linolenate, and sodium rosinate; alkylbenzene sulfonates such as sodium dodecylbenzene sulfonate, potassium dodecylbenzene sulfonate, sodium decylbenzene sulfonate, potassium decylbenzene sulfonate, sodium cetylbenzene sulfonate, and potassium cetylbenzene sulfonate; alkyl sulfosuccinates such as sodium di(2-ethylhexyl) sulfosuccinate, potassium di(2-ethylhexyl) sulfosuccinate, and sodium dioctyl sulfosuccinate; alkyl sulfate ester salts such as sodium lauryl sulfate and potassium lauryl sulfate; polyoxyethylene alkyl ether sulfate ester salts such as sodium polyoxyethylene lauryl ether sulfate and potassium polyoxyethylene lauryl ether sulfate; monoalkyl phosphates such as sodium lauryl phosphate and potassium lauryl phosphate; and the like.

Among these low-molecular weight surfactants, fatty acid salts, alkylbenzene sulfonates, alkyl sulfosuccinate, alkyl sulfate ester salts, and polyoxyethylene alkyl ether sulfate ester salts are preferable, alkylbenzene sulfonates are more preferable, sodium dodecylbenzene sulfonate and potassium dodecylbenzene sulfonate are further preferable, and sodium dodecylbenzene sulfonate is particularly preferable. One of these low-molecular weight surfactants can be used alone, or two or more of them can be used in combination.

The amount of low-molecular weight surfactant to be added is not specifically limited but is preferably 0.01 to 10.0 parts by weight, more preferably 0.1 to 5.0 parts by weight, with respect to 100 parts by weight of polyisoprene contained in the polyisoprene latex, in that the occurrence of aggregates can be suppressed more effectively even with a high solid content concentration of the polyisoprene latex.

The method for adding the low-molecular weight surfactant to the polyisoprene latex is not specifically limited, and known addition methods such as one-time addition, divided addition, and continuous addition can be employed. Further, the low-molecular weight surfactant may be directly added to the polyisoprene latex, or an aqueous solution of the low-molecular weight surfactant may be prepared in advance, so as to add the aqueous solution of the low-molecular weight surfactant prepared to the polyisoprene latex.

Further, the weight-average molecular weight of the high-molecular weight surfactant used in the present invention may be 500 or more, preferably 500 to 100,000, more preferably 3,000 to 50,000, further preferably 5,000 to 30,000.

The high-molecular weight surfactant is not specifically limited, as long as it has a weight-average molecular weight of 500 or more and is a derivative of aromatic sulfonic acid, but compounds represented by formula (1) below are preferable.

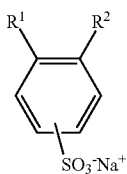
(1)

(In formula (1) above, $R^1$ and $R^2$ each independently represent a hydrogen atom or any organic group, and $R^1$ and $R^2$ may be bound to each other to form a ring structure.)

In formula (1) above, $R^1$ and $R^2$ each independently represent a hydrogen atom or any organic group, and $R^1$ and $R^2$ may be bound to each other to form a ring structure.

In the case where $R^1$ and $R^2$ are not bound to each other, the organic groups that can be $R^1$ and $R^2$ are not specifically limited, but examples thereof include alkyl groups having 1 to 30 carbon atoms such as a methyl group, an ethyl group, a n-propyl group, an isopropyl group, a n-butyl group, an isobutyl group, a sec-butyl group, a t-butyl group, a n-pentyl group, a n-hexyl group, a n-heptyl group, a n-octyl group, a n-nonyl group, and a n-decyl group; cycloalkyl groups having 3 to 30 carbon atoms such as a cyclopropyl group, a cyclopentyl group, a cyclohexyl group, a cycloheptyl group, and a cyclooctyl group; aryl groups having 6 to 30 carbon atoms such as a phenyl group, a biphenyl group, a naphthyl group, and an anthranyl group; alkoxy groups having 1 to 30 carbon atoms such as a methoxy group, an ethoxy group, a n-propoxy group, an isopropoxy group, a n-butoxy group, an isobutoxy group, a sec-butoxy group, a t-butoxy group, a n-pentyloxy group, a n-hexyloxy group, and a phenoxy group; and the like. These organic groups may have a substituent, and the substituent can be located at any position.

Further, in the case where $R^1$ and $R^2$ are bound to each other to form a ring structure, the ring structure is not specifically limited, but aromatic compounds are preferable, aromatic compounds having a benzene ring such as benzene and naphthalene are more preferable, and naphthalene is particularly preferable. These ring structures may have a substituent, and the substituent can be located at any position.

Among the compounds represented by formula (1) above, particularly preferable examples of the high-molecular weight surfactant in the present invention include a high-molecular weight surfactant in which $R^1$ and $R^2$ are bound to each other to form a benzene ring structure in formula (1) above. More specifically, compounds having a structure represented by formula (2) above are preferably used.

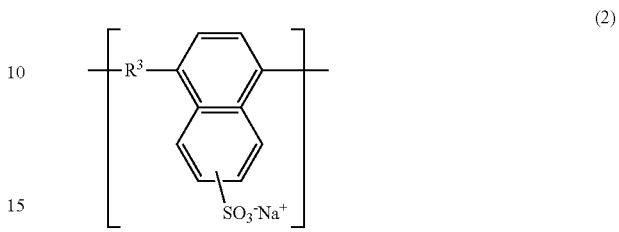
(2)

(In formula (2) above, $R^3$ represents an optionally substituted divalent hydrocarbon group.)

In formula (2) above, $R^3$ is not specifically limited, as long as it is an optionally substituted divalent hydrocarbon group, but is preferably an alkylene group having 1 to 10 carbon atoms, particularly preferably a methylene group.

Further, the high-molecular weight surfactant preferably has the structure represented by formula (2) above repeatedly, and the number of repeating units of the structure represented by formula (2) above is not specifically limited but is preferably 10 to 100, more preferably 20 to 50.

The amount of high-molecular weight surfactant to be added is not specifically limited but is preferably 0.01 to 10 parts by weight, more preferably 0.1 to 5 parts by weight, with respect to 100 parts by weight of polyisoprene contained in the polyisoprene latex, in that the occurrence of aggregates can be suppressed more effectively even with a high solid content concentration of the polyisoprene latex.

The method for adding the high-molecular weight surfactant to the polyisoprene latex is not specifically limited, and known addition methods such as one-time addition, divided addition, and continuous addition can be employed. Further, the high-molecular weight surfactant may be directly added to the polyisoprene latex, or an aqueous solution of the high-molecular weight surfactant may be prepared in advance, so as to add the aqueous solution of the high-molecular weight surfactant prepared to the polyisoprene latex.

The carboxyl group-containing compound used in the present invention is not specifically limited, as long as it is a compound capable of reacting with polyisoprene, but examples thereof include ethylenically unsaturated monocarboxylic acids such as acrylic acid and methacrylic acid; ethylenically unsaturated polyvalent carboxylic acids such as itaconic acid, maleic acid, and fumaric acid; ethylenically unsaturated polyvalent carboxylic acid anhydrides such as maleic anhydride and citraconic anhydride; ethylenically unsaturated polyvalent carboxylic acid partial esters such as monobutyl fumarate, monobutyl maleate, and mono-2-hydroxypropyl maleate; and the like. Among these, ethylenically unsaturated monocarboxylic acids are preferable, and methacrylic acid is particularly preferable. These ethylenically unsaturated carboxylic acids can be used also in the form of alkali metal salts or ammonium salts. Further, one of these carboxyl group-containing compounds can be used alone, or two or more of them can be used in combination.

The amount of carboxyl group-containing compound to be added is preferably 0.01 to 100 parts by weight, more preferably 0.01 to 40 parts by weight, further preferably 0.5 to 20 parts by weight, with respect to 100 parts by weight of polyisoprene contained in the polyisoprene latex, in that the viscosity of the modified polymer latex to be obtained can be appropriate, and the tensile strength of the dip-molded product to be obtained is improved.

The method for adding the carboxyl group-containing compound to the polyisoprene latex is not specifically limited, and known addition methods such as one-time addition, divided addition, and continuous addition can be employed. Further, the carboxyl group-containing compound may be directly added to the polyisoprene latex, or an aqueous solution or a dispersion of the carboxyl group-containing compound may be prepared in advance, so as to add the aqueous solution or the dispersion of the carboxyl group-containing compound prepared to the polyisoprene latex.

The method for reacting the polyisoprene contained in the latex with the carboxyl group-containing compound is not specifically limited, and a conventionally known method used in reaction of modifying polyisoprene with a carboxyl group-containing compound, reaction of graft-polymerizing polyisoprene with a carboxyl group-containing compound, and the like may be used, but a method of adding a carboxyl group-containing compound, a low-molecular weight surfactant, and a high-molecular weight surfactant to the polyisoprene latex, while adding a redox catalyst combining an organic peroxide and a reductant thereto, and then reacting polyisoprene with the carboxyl group-containing compound is, for example, preferable.

The organic peroxide is not specifically limited, but examples thereof include diisopropylbenzene hydroperoxide, cumene hydroperoxide, t-butyl hydroperoxide, 1,1,3,3-tetramethylbutyl hydroperoxide, di-t-butyl peroxide, isobutyryl peroxide, benzoyl peroxide, and the like. For improving the mechanical strength of the dip-molded product to be obtained, 1,1,3,3-tetramethylbutyl hydroperoxide is preferable. One of these organic peroxides may be used alone, or two or more of them may be used in combination.

The amount of organic peroxide to be added is not specifically limited but is preferably 0.01 to 3 parts by weight, more preferably 0.1 to 1 part by weight, with respect to 100 parts by weight of polyisoprene contained in the polyisoprene latex.

The reductant is not specifically limited, but examples thereof include compounds containing reduced metal ions such as ferrous sulfate and cuprous naphthenate; sulfonic acid compounds such as sodium methanesulfonate; amine compounds such as dimethyl aniline; and the like. One of these reductants may be used alone, or two or more of them may be used in combination.

The amount of the reductant to be added is not specifically limited but is preferably 0.01 to 1 part by weight with respect to 1 part by weight of the organic peroxide.

The methods for adding the organic peroxide and the reductant are not specifically limited, and known addition methods such as one-time addition, divided addition, and continuous addition can be used.

The reaction temperature in the reaction of polyisoprene with the carboxyl group-containing compound is not specifically limited but is preferably 5 to 70° C., more preferably 10 to 70° C. The reaction time in the reaction of polyisoprene with the carboxyl group-containing compound is not specifically limited but is preferably 5 to 600 minutes, more preferably 10 to 180 minutes.

The solid content concentration of the polyisoprene latex in the reaction of polyisoprene with the carboxyl group-containing compound is not specifically limited but is preferably 5 to 70 wt %, more preferably 10 to 50 wt %.

According to the present invention, polyisoprene is reacted with the carboxyl group-containing compound in the presence of the low-molecular weight surfactant and the high-molecular weight surfactant, and therefore the occurrence of aggregates can be suppressed even with a high solid content concentration of the polyisoprene latex, as described above, thereby enabling a modified polymer latex with a high solid content concentration to be produced.

In the modified polymer latex of the present invention, the modification rate of the modified polymer constituting the modified polymer latex (that is, the modification rate of polyisoprene by the carboxyl group-containing compound) may be appropriately controlled corresponding to the intended use of the modified polymer latex but is preferably 10 mol % or more, more preferably 15 mol % or more, further preferably 20 mol % or more. The modification rate is represented by formula (i) below.

$$\text{Modification rate (mol \%)} = (X/Y) \times 100 \qquad (i)$$

In formula (i) above, X represents the total number of moles of modified groups (=carboxyl groups) by the carboxyl group-containing compound in the modified polymer, and Y represents the total number of moles of the carboxyl group-containing compound used for the modification reaction (=monomers introduced for the reaction), respectively. X can be determined by examining the modified polymer by $^1$H-NMR. Further, Y can be determined based on the total weight of the carboxy compound introduced for the reaction.

The modified polymer latex of the present invention may contain additives that are generally contained in the field of latex, such as pH adjusters, defoamers, preservatives, chelating agents, oxygen scavengers, dispersants, and anti-aging agents.

Examples of the pH adjusters include alkali metal hydroxides such as sodium hydroxide and potassium hydroxide; alkali metal carbonates such as sodium carbonate and potassium carbonate; alkali metal hydrogen carbonates such as sodium hydrogen carbonate; ammonia; organic amine compounds such as trimethylamine and triethanolamine, and the like. Alkali metal hydroxides and ammonia are preferable.

Further, concentration operation may be applied, as needed, after the modified polymer latex is obtained as described above, in order to increase the solid content concentration of the modified polymer latex, by methods such as vacuum distillation, normal pressure distillation, centrifugation, and membrane concentration. Centrifugation is preferably performed in that the amount of anionic surfactants remaining in the modified polymer latex can be adjusted.

In the case where the modified polymer latex is treated in a centrifuge, the pH of the latex is preferably adjusted by adding a pH adjuster in advance to 7 or more, more preferably to 9 or more, for improving the mechanical stability of the modified polymer latex. As the pH adjuster, alkali metal hydroxides such as sodium hydroxide and potassium hydroxide or ammonia are preferable.

When the pH of the latex is adjusted, carboxyl groups in the modified polymer may be in the form of salts.

The centrifugation is preferably performed, for example, using a continuous centrifuge, under the conditions in which the centrifugal force is preferably 4,000 to 5,000 G, the feed flow rate into the centrifuge is preferably 500 to 2000 Kg/hr, and the back pressure of the centrifuge (gauge pressure) is preferably 0.03 to 1.6 MPa.

The solid content concentration of the modified polymer latex of the present invention is preferably 30 to 70 wt %, more preferably 40 to 70 wt %. Adjusting the solid content concentration to the aforementioned ranges can suppress the separation of polymer particles during storage of the modified polymer latex and the occurrence of coarse aggregates due to the polymer particles of the modified polymer latex aggregating with each other.

The volume-average particle size of the modified polymer latex of the present invention is 0.5 to 10 μm, preferably 0.5 to 3 μm, more preferably 0.5 to 2 μm. Adjusting the volume-average particle size to the aforementioned ranges can make the viscosity of the modified polymer latex more appropriate, thereby facilitating the handling during transfer by a pump or the like, and can suppress formation of a film on the surface of the latex more effectively during storage of the modified polymer latex.

The amount of carboxyl groups (including those in the form of salts) in the modified polymer constituting the modified polymer latex of the present invention is represented by an acid content (meq/g) on the surface per gram of the polymer determined by conductometric titration and is preferably 0.05 to 2.0 meq/g, more preferably 0.05 to 1.5 meq/g, particularly preferably 0.05 to 1.0 meq/g. Adjusting the acid content on the surface to the aforementioned ranges makes the viscosity of the modified polymer latex more appropriate to facilitate the handling during transfer by a pump or the like and can further improve the tensile strength of the dip-molded product to be obtained.

The acid content on the surface (meq/g) by conductometric titration may be measured by the same method as in "measurement of acid content on surface and in water phase" disclosed in Japanese Patent Application Laid-Open No. 2002-53602.

Further, the content ratio of monomer units derived from the carboxyl group-containing compound in the modified polymer constituting the modified polymer latex is preferably 0.01 to 50 wt %, more preferably 0.5 to 40 wt %, further preferably 1 to 30 wt %, particularly preferably 1 to 15 wt %, with respect to all monomer units constituting the modified polymer. Adjusting the content ratio of monomer units derived from the carboxyl group-containing compound in the modified polymer to the aforementioned ranges can further improve the mechanical stability of the modified polymer latex, as well as the tensile strength and the tear strength of the dip-molded product to be obtained, and can suppress excessive hardening when the dip-molded product is used for gloves or the like more effectively.

Latex Composition

The latex composition of the present invention is famed by adding a cross-linking agent to the modified polymer latex of the present invention.

Examples of the cross-linking agent include sulfurs such as powder sulfur, flowers of sulfur, precipitated sulfur, colloid sulfur, surface-treated sulfur, and insoluble sulfur; and sulfur-containing compounds such as sulfur chloride, sulfur dichloride, morpholine disulfide, alkyl phenol disulfide, caprolactam disulfide (N,N'-dithio-bis(hexahydro-2H-azepinone-2)), phosphorus-containing polysulfides, polymer polysulfides, and 2-(4'-morpholinodithio) benzothiazole. Among these, sulfurs can be preferably used. One of the cross-linking agents may be used alone, or two or more of them may be used in combination.

The content of cross-linking agent is not specifically limited but is preferably 0.1 to 10 parts by weight, more preferably 0.2 to 3 parts by weight, with respect to 100 parts by weight of the modified polymer constituting the modified polymer latex. Adjusting the content of cross-linking agent to the aforementioned ranges can further enhance the tensile strength of the dip-molded product to be obtained.

Further, the latex composition of the present invention preferably further contains a cross-linking accelerator.

As the cross-linking accelerator, cross-linking accelerators that are generally used in dip molding can be used, and examples thereof include dithiocarbamic acids such as diethyldithiocarbamic acid, dibutyldithiocarbamic acid, di-2-ethylhexyldithiocarbamic acid, dicyclohexyldithiocarbamic acid, diphenyldithiocarbamic acid, and dibenzyldithiocarbamic acid, and zinc salts thereof; 2-mercaptobenzothiazole, zinc 2-mercaptobenzothiazole, 2-mercaptothiazoline, dibenzothiazyl disulfide, 2-(2,4-dinitrophenylthio)benzothiazole, diethylthio carbaylthio)benzothiazole, 2-(2,6-dimethyl-4-morpholinothio)benzothiazole, 2-(4'-morpholino dithio) benzothiazole, 4-morpholinyl-2-benzothiazyl disulfide, 1,3-bis(2-benzothiazyl mercaptomethyl)urea, and the like. Zinc diethyldithiocarbamate, 2 zinc dibutyldithiocarbamate, and zinc 2-mercaptobenzothiazole are preferable. One of the cross-linking accelerators may be used alone, or two or more of them may be used in combination.

The content of cross-linking accelerator is preferably 0.05 to 5 parts by weight, more preferably 0.1 to 2 parts by weight, with respect to 100 parts by weight of the modified polymer constituting the modified polymer latex. Adjusting the content of cross-linking accelerator to the aforementioned ranges can further enhance the tensile strength of the dip-molded product to be obtained.

Further, the latex composition of the present invention preferably further contains zinc oxide. The content of zinc oxide is not specifically limited but is preferably 0.1 to 5 parts by weight, more preferably 0.2 to 2 parts by weight, with respect to 100 parts by weight of the modified polymer constituting the modified polymer latex. Adjusting the content of zinc oxide to the aforementioned ranges can further enhance the tensile strength of the dip-molded product to be obtained while making the emulsification stability favorable.

The latex composition of the present invention can further contain compounding agents including anti-aging agents, dispersants; reinforcers such as carbon black, silica, and talc; fillers such as calcium carbonate and clay; ultraviolet absorbers; and plasticizers, as required.

The method for preparing the latex composition of the present invention is not specifically limited, but examples thereof include a method of mixing a cross-linking agent and various compounding agents to be mixed, as required, to the modified polymer latex using a disperser such as a ball mill, a kneader, and a disperser, a method of preparing an aqueous dispersion of ingredients other than the modified polymer latex using the aforementioned disperser and thereafter mixing the aqueous dispersion with the modified polymer latex, and the like.

The pH of the latex composition of the present invention is preferably 7 or more, more preferably in the range of 7 to 13, further preferably in the range of 8 to 12. Further, the solid content concentration of the latex composition is preferably in the range of 15 to 65 wt %.

The latex composition of the present invention is preferably aged (pre-cross-linked) before dip molding, for further enhancing the mechanical properties of a dip-molded product to be obtained. The pre-cross-linking time is not specifically limited and depends also on the pre-cross-linking temperature but is preferably 1 to 14 days, more preferably 1 to 7 days. The pre-cross-linking temperature is preferably 20 to 40° C.

Then, after the pre-cross-linking, the latex composition is preferably stored at a temperature of 10 to 30° C. until the dip molding. If the latex composition is stored at high temperature, the tensile strength of a dip-molded product to be obtained may possibly decrease in some cases.

Dip-Molded Product

The dip-molded product of the present invention is obtained by dip-molding the latex composition of the present invention. The dip molding is a method of immersing a mold in the latex composition, depositing the composition on the surface of the mold, then pulling the mold out of the composition, and thereafter drying the composition deposited on the surface of the mold. The mold before the immersion in the latex composition may be preheated. Further, before the mold is immersed in the latex composition or after the mold is pulled out of the latex composition, a coagulant can be used, as required.

Specific examples of the method for using the coagulant include a method of attaching the coagulant to the mold by immersing, in a coagulant solution, the mold before the immersion in the latex composition (anode coagulant dipping), and a method of immersing the mold on which the latex composition has been deposited in a coagulant solution (Teague coagulant dipping), and the anode coagulant dipping is preferable in that a dip-molded product with less unevenness in thickness is obtained.

Specific examples of the coagulant include water-soluble polyvalent metal salts including metal halides such as barium chloride, calcium chloride, magnesium chloride, zinc chloride, and aluminum chloride; nitrates such as barium nitrate, calcium nitrate, and zinc nitrate; acetates such as barium acetate, calcium acetate, and zinc acetate; and sulfates such as calcium sulfate, magnesium sulfate, and aluminum sulfate. Among these, calcium salts are preferable, and calcium nitrate is more preferable. One of these water-soluble polyvalent metal salts can be used alone, or two or more of them can be used in combination.

The coagulant is preferably used in the form of an aqueous solution. The aqueous solution may further contain water-soluble organic solvents such as methanol and ethanol, and nonionic surfactants. The concentration of the coagulant differs depending on the type of the water-soluble polyvalent metal salts but is preferably 5 to 50 wt %, more preferably 10 to 30 wt %.

The mold after being pulled out of the latex composition is generally heated to dry the deposit famed on the mold. The drying conditions may be appropriately selected.

Subsequently, the deposit famed on the mold is cross-linked by heating.

The heating conditions during cross-linking is not specifically limited but include a heating temperature of preferably 60 to 150° C., more preferably 100 to 130° C., and a heating time of preferably 10 to 120 minutes.

The heating method is not specifically limited, but examples thereof include a heating method using hot air in an oven, a heating method by emitting infrared rays, and the like.

Further, the mold is preferably washed with water or hot water before or after heating the mold with the latex composition deposited thereon, in order to remove water-soluble impurities (such as excess surfactants and coagulants). The hot water to be used is preferably at 40° C. to 80° C., more preferably 50° C. to 70° C.

The dip-molded product after cross-linking is detached from the mold. Specific examples of the detachment method include a method of separation from the mold by hand, a method of separation by water pressure or compressed air pressure, and the like. If the dip-molded product in the course of cross-linking has a sufficient strength for detachment, the dip-molded product may be detached in the course of cross-linking and thereafter may be continuously cross-linked.

The dip-molded product of the present invention is obtained using a modified polymer latex to be obtained by the production method of the present invention and therefore can improve the production amount (production efficiency) per unit time and can reduce the amount of waste solution when concentrating the modified polymer latex, thereby reducing the environmental load. The dip-molded product of the present invention can be used particularly suitably for gloves, for example. In the case where the dip-molded product forms a glove, inorganic fine particles such as talc and calcium carbonate or organic fine particles such as starch particles may be spread onto the surface of the glove, an elastomer layer containing fine particles may be famed on the surface of the glove, or the surface layer of the glove may be chlorinated, in order to prevent the close contact on the contact surface of the molded film with itself and improve slippage when putting it on and taking it off.

Further, the dip-molded product of the present invention can be used as medical supplies such as baby bottle nipples, droppers, tubes, water pillows, balloon stalls, catheters, and condoms; toys such as balloons, dolls, and balls; industrial supplies such as pressure molding bags and gas storage bags; fingerstalls; and the like, other than the aforementioned glove.

Adhesive Layer-Forming Substrate

The adhesive layer-forming substrate of the present invention is obtained by forming, on a surface of a substrate, an adhesive layer famed using the modified polymer latex or the adhesive composition of the present invention.

The substrate is not specifically limited, but a fiber substrate, for example, can be used. The type of fibers constituting the fiber substrate is not specifically limited, and examples thereof include vinylon fibers, polyester fibers, polyamide fibers such as nylon and aramid (aromatic polyamide), glass fibers, cottons, rayons, and the like. These can be appropriately selected corresponding to the application. The shape of the fiber substrate is not specifically limited, and examples thereof can include shapes of staples, filaments, cords, ropes, woven fabrics (such as canvas), and the like, which can be appropriately selected corresponding to the application. For example, the adhesive layer-forming substrate can be used as a substrate-rubber composite by adhering to rubber via an adhesive layer. The substrate-rubber composite is not specifically limited, but examples thereof include a toothed rubber belt with a core using a fiber substrate in the form of a cord, a toothed rubber belt using a fiber substrate in the form of a base fabric such as a canvas, and the like.

The method for obtaining the substrate-rubber composite is not specifically limited, but examples thereof include a method of attaching the adhesive composition to a substrate, for example, by immersion and the like to obtain an adhesive layer-forming substrate and placing the adhesive layer-forming substrate on rubber, followed by heating and pressurization. The pressurization can be performed using a compression (press) molding machine, a metal roll, an injection molding machine, and the like. The pressure for the pressurization is preferably 0.5 to 20 MPa, more preferably 2 to 10 MPa. The heating temperature is preferably 130 to 300° C., more preferably 150 to 250° C. The heating and pressurization time is preferably 1 to 180 minutes, more preferably 5 to 120 minutes. The heating and pressurization method enables molding of rubber and adhesion between the adhesive layer-forming substrate and the rubber to be performed simultaneously. A mold for imparting a desired surface shape to the rubber of the substrate-rubber composite as a target is preferably famed on the inner surface of the mold of the compressor or the surface of the roll used for the pressurization.

Further, one aspect of the substrate-rubber composite can include a substrate-rubber-substrate composite. The substrate-rubber-substrate composite can be famed, for example, by combining a substrate (which may be a composite of two or more substrates) with the substrate-rubber composite. Specifically, a core serving as a substrate and a base fabric serving as rubber and a substrate are layered (at this time, the adhesive composition has been appropriately attached to the core and the base fabric to form an adhesive layer-foiling substrate), followed by pressurization under heating, so that a substrate-rubber-substrate composite can be obtained.

The substrate-rubber composite to be obtained using the adhesive layer-forming substrate of the present invention is excellent in mechanical strength, abrasion resistance, and water resistance and therefore can be suitably used as a belt such as a flat belt, a V belt, a V-ribbed belt, a round belt, a square belt, and a toothed belt. Further, the substrate-rubber composite to be obtained using the adhesive layer-forming substrate of the present invention is excellent in oil resistance and can be suitably used as an in-oil belt. Further, the substrate-rubber composite to be obtained using the adhesive layer-forming substrate of the present invention can be suitably used also for hoses, tubes, diaphragms, and the like. Examples of the hoses include single-tube rubber hoses, multilayer rubber hoses, braided reinforced hoses, fabric-wrapped reinforced hoses, and the like. Examples of the diaphragms include flat diaphragms, rolling diaphragms, and the like.

The substrate-rubber composite to be obtained using the adhesive layer-forming substrate of the present invention can be used also as industrial products such as seals and rubber rolls other than the aforementioned applications. Examples of the seals include seals for moving parts such as rotating, swinging, and reciprocating parts and seals for fixed parts. Examples of the seals for moving parts include oil seals, piston seals, mechanical seals, boots, dust covers, diaphragms, accumulators, and the like. Examples of the seals for fixed parts include o-rings, various gaskets, and the like. Examples of the rubber rolls include rolls that are parts of OA equipment such as printing equipment and copy equipment; fiber processing rolls such as stretching rolls for spinning and draft rolls for spinning; steel rolls such as bridle rolls, snubber rolls, and steering rolls; and the like.

EXAMPLES

Hereinafter, the present invention will be described more specifically by way of examples and comparative examples, but the present invention is not limited to these examples. In the following description, "%" and "part(s)" are on a weight basis, unless otherwise specified. Various physical properties were measured as follows.

Weight-Average Molecular Weight (Mw)

Each sample was diluted with tetrahydrofuran so as to have a solid content concentration of 0.1 wt %, and the resultant solution was subjected to gel permeation chromatography, to calculate the weight-average molecular weight (Mw) in terms of standard polystyrene.

Solid Content Concentration 2 g of each sample was accurately weighed (weight: X2) into an aluminum dish (weight: X1), followed by drying in a hot air dryer at 105° C. for 2 hours. Subsequently, after cooling in a desiccator, the weight thereof including the aluminum dish was measured (weight: X3), to calculate the solid content concentration according to the following calculation formula.

Solid content concentration (wt %)=($X3$−$X1$)×100/$X2$

Content of Anionic Surfactants

After 0.15 g of a synthetic polyisoprene latex was accurately weighed and was added to 2 ml of ultrapure water, acetonitrile was added thereto, thereby adjusting the solution to 10 ml. Subsequently, the supernatant was filtered by a disk filter with a pore size of 0.2 μm and was thereafter examined using reverse-phase high-performance liquid chromatography (HPLC) under the following conditions.

Column: product name "ZORBOX XDB-C18 1.8μ" (available from Agilent Technologies, Inc.)
Column temperature: 40° C.
Flow rate: 0.75 ml/min.
Detector: DAD (diode array detector)
Injection volume: 2 μL Amount of Residual Metals The amount of residual metals (the total content of aluminum atoms and titanium atoms) in the modified polymer latex was measured using inductively coupled plasma-atomic emission spectrometry (product name "SPS-5100", available from SII NanoTechnology Inc.) as follows.

0.15 g of the modified polymer latex was weighed into a platinum crucible. This was heated to evaporate moisture, followed by addition of 0.2 ml of sulfuric acid thereto, and was further heated until smoke did not come out. This was put in an electric furnace at 550° C. for 2 hours for asking, and 0.5 ml of sulfuric acid and 5 ml of ultrapure water were added and dissolved therein by further heating. After 0.2 ml of nitric acid was added thereto, the solution was diluted with ultrapure water so that the total amount was 20 ml, to give a measurement sample.

Modification Rate

The modified polymer constituting the modified polymer latex was measured by $^1$H-NMR, thereby determining the total number of moles of modified groups (=carboxyl groups) by the carboxyl group-containing compound in the modified polymer. Subsequently, the modification rate by the carboxyl group-containing compound was determined by formula (i) below, based on the total number of moles of modified groups determined.

Modification rate (mol %)=($X/Y$)×100     (i)

In formula (i) above, X represents the total number of moles of modified groups (=carboxyl groups) by the carboxyl group-containing compound in the modified polymer, and Y represents the total number of moles of the carboxyl group-containing compound used for the modification reaction (=monomers introduced for the reaction), respectively.

Content Ratio of Aggregates

According to the aforementioned method, the solid content concentration of the modified polymer latex was measured, and 100 g of the modified polymer latex was accurately weighed. Thereafter, the modified polymer latex was filtered by a 200-mesh SUS wire screen of known weight, and aggregates on the wire screen were washed with water several times, to remove the modified polymer latex. The aggregates were dried at 105° C. for 2 hours or more, and thereafter the dry weight was measured to determine the content of aggregates (unit: wt %) based on the formula below.

Content of aggregates (wt %)={($\alpha$−$\beta$)/($\gamma$×$\Delta$)}×10,000

Here, α represents the weight of the wire screen and dry aggregates after drying, β represents the weight of the wire screen, γ represents the weight of the modified polymer latex, and Δ represents the total weight of solid contents of the modified polymer latex, respectively.

Adhesion of Aggregates to Reaction Container

After the modified polymer latex was produced in a reaction container with stirrer, the reaction container was observed by visual inspection, to evaluate the deposition amount of aggregates onto the reaction container and the stirrer according to the following criteria.
1: Adhesion of aggregates to any one of the reaction container and the stirrer was not observed.
2: Adhesion of aggregates to both of the reaction container and the stirrer was observed, but the deposition amount was small.
3: Adhesion of aggregates to both of the reaction container and the stirrer was observed.
4: Adhesion of a large amount of aggregates to both of the reaction container and the stirrer was observed.

Example 1

Production of Synthetic Polyisoprene Latex

Synthetic polyisoprene (product name "NIPOL IR2200L", available from Zeon Corporation, isoprene homopolymer, and amount of cis-bond units: 98%) with a weight-average molecular weight of 1,300,000 was mixed with cyclohexane and dissolved therein by raising the temperature to 60° C. under stirring, to prepare a cyclohexane solution (a) of polyisoprene (solid content concentration: 8 wt %) with a viscosity, as measured using a type B viscometer, of 12,000 mPa·s.

Meanwhile, 20 parts of sodium rosinate was added to water and dissolved therein by raising the temperature to 60° C., to prepare an anionic surfactant aqueous solution (b) with a concentration of 1.5 wt %.

Next, the cyclohexane solution (a) and the anionic surfactant aqueous solution (b) were mixed at a weight ratio of 1:1.5 using a mixer (product name "Multi Line mixer MS26-MMR-5.5L", available from SATAK CHEMICAL EQUIPMENT MFG., LTD.) and then were mixed and emulsified at a rotational speed of 4100 rpm using an emulsifying device (product name "MILDER MDN310", available from Pacific Machinery & Engineering Co., Ltd.), to obtain an emulsified liquid (c). At that time, the total feed flow rate of the cyclohexane solution (a) and the anionic surfactant aqueous solution (b) was 2,000 kg/hr, the temperature was 60° C., and the back pressure (gauge pressure) was 0.5 MPa.

Subsequently, the emulsified liquid (c) was heated to 80° C. under reduced pressure of −0.01 to −0.09 MPa (gauge pressure), thereby distilling off cyclohexane, to obtain an aqueous dispersion (d) of synthetic polyisoprene. At that time, a defoamer (product name "SM5515", available from Dow Corning Toray Co., Ltd.) was continuously added by spraying in amount of 300 ppm by weight with respect to synthetic polyisoprene in the emulsified liquid (c). When distilling off cyclohexane, the emulsified liquid (c) was adjusted to 70 vol % or less of the tank volume, and stirring was gradually conducted at 60 rpm using a three-stage inclined paddle blade as a stirring blade.

After the completion of distilling off cyclohexane, the aqueous dispersion (d) of synthetic polyisoprene obtained was centrifuged at 4,000 to 5,000 G using a continuous centrifuge (product name "SRG510", available from Alfa Laval AB), to obtain synthetic polyisoprene latex (e) with a solid content concentration of 56 wt % as a light liquid. The centrifugation conditions of a solid content concentration of the aqueous dispersion (d) before centrifugation of 10 wt %, a flow rate during continuous centrifugation of 1300 kg/hr, and a back pressure (gauge pressure) of the centrifuge of 1.5 MPa were employed.

The synthetic polyisoprene latex (e) obtained had a solid content concentration of 56 wt %, a volume-average particle size of 1.0 μm, a pH of 10, a viscosity, as measured using a type B viscometer, of 120 mPa·s, and the total content of anionic surfactants of 3.0 parts per 100 parts of synthetic polyisoprene. Further, no aggregates were observed in the synthetic polyisoprene latex (e), and the amount of residual metals (the total content of aluminum atoms and titanium atoms) in the latex (e) was 250 weight ppm.

Production of Modified Polymer Latex

The synthetic polyisoprene latex (e) obtained as described above was diluted with 130 parts of distilled water with respect to 100 parts of synthetic polyisoprene. Subsequently, 1.0 part of sodium dodecylbenzene sulfonate (weight-average molecular weight: 348) as a low-molecular weight surfactant (A-1) was added to the synthetic polyisoprene latex (e) with respect to 100 parts of synthetic polyisoprene, and 1.1 parts of a sodium salt of β-naphthalenesulfonic acid formalin condensate (product name "DEMOL T-45", weight-average molecular weight:7,000, available from Kao Corporation) as a high-molecular weight surfactant (B-1) diluted with 4 parts of distilled water with respect to 100 parts of synthetic polyisoprene was further added thereto over 5 minutes. Subsequently, the synthetic polyisoprene latex (e) with the low-molecular weight surfactant (A-1) and the high-molecular weight surfactant (B-1) added was put into a nitrogen-purged reaction container with stirrer, followed by heating to a temperature of 30° C. under stirring. Further, 5 parts of methacrylic acid as the carboxyl group-containing compound and 16 parts of distilled water were mixed using another container, to prepare a methacrylic acid diluent. The methacrylic acid diluent was added into the reaction container heated to 30° C. over 30 minutes.

Further, a solution (f) composed of 7 parts of distilled water, 0.32 parts of sodium formaldehyde sulfoxylate (product name "SFS", available from MITSUBISHI GAS CHEMICAL COMPANY, INC.), 0.01 parts of ferrous sulfate (product name "Frost Fe", available from CHELEST CORPORATION) was prepared using another container. The solution (f) was transferred into the reaction container, and thereafter 0.5 parts of 1,1,3,3-tetramethylbutyl hydroperoxide (product name "PEROCTA H", available from NOF CORPORATION) was added thereto to allow reaction at 30° C. for 1 hour, thereby obtaining a modified polymer latex. The solid content concentration of the modified polymer latex after the reaction was 40 wt %. Then, the modified polymer latex obtained was evaluated for the modification rate, the content ratio of aggregates, and the adhesion of aggregates to the reaction container according to the aforementioned methods. Table 1 shows the results.

Example 2

A modified polymer latex was produced in the same manner as in Example 1 except that a special polycarboxylic acid-type polymer surfactant (product name "DEMOL P", weight-average molecular weight: 12,000, available from Kao Corporation) as a high-molecular weight surfactant (B-2) was used, instead of the high-molecular weight surfactant (B-1), and was evaluated in the same manner. Table 1 shows the results.

Example 3

A modified polymer latex was produced in the same manner as in Example 1 except that a sodium salt of β-naphthalenesulfonic acid formalin condensate (product name "DEMOL N", weight-average molecular weight: 2,500, available from Kao Corporation) as a high-molecular weight surfactant (B-3) was used, instead of the high-molecular weight surfactant (B-1), and was evaluated in the same manner. Table 1 shows the results.

Example 4

A modified polymer latex was produced in the same manner as in Example 1 except that sodium alkyl diphenyl ether disulfonate (product name "PELEX SS-H", weight-average molecular weight: 529, available from Kao Corporation) as a high-molecular weight surfactant (B-4) was used, instead of the high-molecular weight surfactant (B-1), and was evaluated in the same manner. Table 1 shows the results.

Example 5

A modified polymer latex was produced in the same manner as in Example 1 except that a mixture of 3 parts of methacrylic acid and 16 parts of distilled water was used as a methacrylic acid diluent, instead of the mixture of 5 parts of methacrylic acid and 16 parts of distilled water, and was evaluated in the same manner. Table 1 shows the results.

Comparative Example 1

First, a synthetic polyisoprene latex (e) was prepared in the same manner as in Example 1. Next, 1.0 part of sodium dodecylbenzene sulfonate as the low-molecular weight surfactant (A-1) was added to the synthetic polyisoprene latex (e) with respect to 100 parts of synthetic polyisoprene, and 130 parts of distilled water was further added thereto for dilution. Subsequently, the synthetic polyisoprene latex (e) with the low-molecular weight surfactant (A-1) added was put into a nitrogen-purged reaction container with stirrer, followed by heating to a temperature of 30° C. under stirring. Further, 5 parts of methacrylic acid and 16 parts of distilled water were mixed using another container, to prepare a methacrylic acid diluent. The methacrylic acid diluent was added into the reaction container heated to 30° C. over 30 minutes.

Further, a solution (f) consisting of 7 parts of distilled water, 0.32 parts of sodium formaldehyde sulfoxylate (product name "SFS", available from MITSUBISHI GAS CHEMICAL COMPANY, INC.), and 0.01 parts of ferrous sulfate (product name "Frost Fe", available from CHELEST CORPORATION) was prepared using another container. The solution (f) was transferred to the reaction container, and thereafter 0.5 parts of 1,1,3,3-tetramethylbutyl hydroperoxide (product name "PEROCTA H", available from NOF CORPORATION) was added thereto to allow reaction at 30° C. for 1 hour, thereby obtaining a modified polymer latex. The solid content concentration of the modified polymer latex after the reaction was 40 wt %. Then, the modified polymer latex obtained was evaluated for the modification rate, the content ratio of aggregates, and the adhesion of aggregates to the reaction container according to the aforementioned methods. Table 1 shows the results.

Comparative Example 2

First, a synthetic polyisoprene latex (e) was prepared in the same manner as in Example 1. Next, 1.1 parts of a sodium salt of β-naphthalenesulfonic acid formalin condensate (product name "DEMOL T-45", available from Kao Corporation) as the high-molecular weight surfactant (B-1) diluted with 4 parts of distilled water with respect to 100 parts of synthetic polyisoprene was added to the synthetic polyisoprene latex (e) with respect to 100 parts of synthetic polyisoprene over 5 minutes. Subsequently, the synthetic polyisoprene latex (e) with the high-molecular weight surfactant (B-1) added was diluted with 130 parts of distilled water and was thereafter put into a nitrogen-purged reaction container with stirrer, followed by heating to a temperature of 30° C. under stirring. Further, 5 parts of methacrylic acid and 16 parts of distilled water were mixed using another container, to prepare a methacrylic acid diluent. The methacrylic acid diluent was added into the reaction container heated to 30° C. over 30 minutes. After completion of the addition of the methacrylic acid diluent, the inside of the reaction container was checked by visual inspection. As a result, a large amount of aggregates occurred, and thus the reaction was stopped.

TABLE 1

| | | Example | | | | | Comparative Example | |
|---|---|---|---|---|---|---|---|---|
| | | 1 | 2 | 3 | 4 | 5 | 1 | 2 |
| Ingredients | | | | | | | | |
| Synthetic polyisoprene | (parts) | 100 | 100 | 100 | 100 | 100 | 100 | 100 |
| Low-molecular weight surfactant (A-1) (weight-average molecular weight: 348) | (parts) | 1.0 | 1.0 | 1.0 | 1.0 | 1.0 | 1.0 | |
| High-molecular weight surfactant (B-1) (weight-average molecular weight: 7,000) | (parts) | 1.1 | | | | 1.1 | | 1.1 |
| High-molecular weight surfactant (B-2) (weight-average molecular weight: 12,000) | (parts) | | 1.1 | | | | | |
| High-molecular weight surfactant (B-3) (weight-average molecular weight: 2,500) | (parts) | | | 1.1 | | | | |
| High-molecular weight surfactant (B-4) (weight-average molecular weight: 529) | (parts) | | | | 1.1 | | | |
| Methacrylic acid | (parts) | 5 | 5 | 5 | 5 | 3 | 5 | 5 |
| Sodium formaldehyde sulfoxylate | (parts) | 0.32 | 0.32 | 0.32 | 0.32 | 0.32 | 0.32 | 0.32 |
| Ferrous sulfate | (parts) | 0.01 | 0.01 | 0.01 | 0.01 | 0.01 | 0.01 | 0.01 |

TABLE 1-continued

|  |  | Example | | | | | Comparative Example | |
|---|---|---|---|---|---|---|---|---|
|  |  | 1 | 2 | 3 | 4 | 5 | 1 | 2 |
| 1,1,3,3-Tetramethylbutyl hydroperoxide | (parts) | 0.5 | 0.5 | 0.5 | 0.5 | 0.5 | 0.5 | 0.5 |
| Solid content concentration of latex put into reaction container | (wt %) | 40 | 40 | 40 | 40 | 40 | 40 | 40 |
| Evaluation | | | | | | | | |
| Modification rate | (mol %) | 10 | 10 | 10 | 10 | 20 | 10 | —* |
| Content ratio of aggregates | (wt %) | 0.03 | 0.05 | 0.07 | 0.12 | 0.01 | 1.1 | —* |
| Adhesion of aggregates to reaction container |  | 1 | 2 | 2 | 3 | 1 | 4 | 4 |

*Since a large amount of aggregates occurred in the reaction container when a modified polymer latex was produced, thereby failing to obtain the modified polymer latex, the modification rate and the content ratio of aggregates were not evaluated.

Table 1 showed that, in the modified polymer latex produced by adding a carboxyl group-containing compound, a low-molecular weight surfactant, and a high-molecular weight surfactant to a polyisoprene latex, and reacting polyisoprene contained in the latex with the carboxyl group-containing compound in the presence of the low-molecular weight surfactant and the high-molecular weight surfactant, the content ratio of aggregates was low, even if the solid content concentration of the latex before the reaction (the solid content concentration of the latex put into the reaction container) was as high as 40 wt %, and adhesion of aggregates to the reaction container was also suppressed (Examples 1 to 5).

Meanwhile, in the modified polymer latex produced by reacting polyisoprene contained in the latex with a carboxyl group-containing compound without using a high-molecular weight surfactant, the content ratio of aggregates increased, when the solid content concentration of the latex before the reaction (the solid content concentration of the latex put into the reaction container) was as high as 40 wt %, and adhesion of aggregates to the reaction container also increased (Comparative Example 1).

Further, in the modified polymer latex produced by reacting polyisoprene contained in the latex with a carboxyl group-containing compound without using a low-molecular weight surfactant, a large amount of aggregates occurred in the reaction container, when the solid content concentration of the latex before the reaction (the solid content concentration of the latex put into the reaction container) was as high as 40 wt %, and it was impossible to continue the reaction (Comparative Example 2).

The invention claimed is:

1. A method for producing a modified polymer latex, comprising:
    adding a carboxyl group-containing compound, an anionic surfactant having a weight-average molecular weight of less than 500, and an anionic surfactant having a weight-average molecular weight of 500 or more to a polyisoprene latex; and
    reacting polyisoprene contained in the polyisoprene latex with the carboxyl group-containing compound in a presence of the anionic surfactant having a weight-average molecular weight of less than 500 and the anionic surfactant having a weight-average molecular weight of 500 or more.

2. The method for producing a modified polymer latex according to claim 1, wherein
    the anionic surfactant having a weight-average molecular weight of 500 or more is a compound having a sulfonic acid group.

3. The method for producing a modified polymer latex according to claim 1, wherein
    the anionic surfactant having a weight-average molecular weight of 500 or more is a compound having a naphthalene structure.

4. The method for producing a modified polymer latex according to claim 1, wherein
    an amount of the anionic surfactant having a weight-average molecular weight of 500 or more to be added is 0.01 to 10 parts by weight with respect to 100 parts by weight of polyisoprene contained in the polyisoprene latex.

5. The method for producing a modified polymer latex according to claim 1, wherein
    the anionic surfactant having a weight-average molecular weight of less than 500 is an alkylbenzene sulfonate.

6. The method for producing a modified polymer latex according to claim 1, wherein
    an amount of the anionic surfactant having a weight-average molecular weight of less than 500 to be added is 0.01 to 10 parts by weight with respect to 100 parts by weight of polyisoprene contained in the polyisoprene latex.

7. A method for producing a latex composition, comprising a step of adding a cross-linking agent to the modified polymer latex obtained by the production method according to claim 1.

8. A method for producing a dip-molded product, comprising a step of dip-molding the latex composition obtained by the production method according to claim 7.

9. A method for producing an adhesive layer-forming substrate, comprising a step of forming an adhesive layer using a modified polymer latex obtained by the production method according to claim 1 on a surface of a substrate.

\* \* \* \* \*